United States Patent [19]

Eberle

[11] 4,456,497

[45] Jun. 26, 1984

[54] WOOD I-BEAM AND METHOD OF FABRICATING THE SAME

[76] Inventor: George F. Eberle, 414 Killearn La., St. Louis, Mo. 63141

[21] Appl. No.: 428,165

[22] Filed: Sep. 29, 1982

[51] Int. Cl.[3] .............................................. B32B 31/00

[52] U.S. Cl. .................................... 156/257; 428/120; 144/354; 144/352; 52/729; 52/730; 156/258; 156/263; 156/293

[58] Field of Search ................. 52/729, 730, 690, 642, 52/644, 595; 403/354, 265, 277, 289, 290; 46/29; 29/155, 522; 144/354, 352, 347; 428/120; 156/258, 263, 293, 257

[56] References Cited

U.S. PATENT DOCUMENTS

| | | | |
|---|---|---|---|
| 1,030,939 | 7/1912 | Sturgis | 403/290 |
| 1,920,021 | 7/1933 | Schroeder | 403/290 |
| 2,123,081 | 7/1938 | Sadenwater | 403/290 |
| 3,490,188 | 1/1970 | Troutner | 52/729 |
| 3,991,535 | 11/1976 | Keller et al. | 52/690 |
| 4,336,678 | 6/1982 | Peters | 52/690 |

FOREIGN PATENT DOCUMENTS

| | | | |
|---|---|---|---|
| 0036328 | 7/1967 | Finland | 52/729 |
| 0140019 | 4/1953 | Sweden | 52/729 |

*Primary Examiner*—John E. Murtagh
*Assistant Examiner*—Kathryn Ford
*Attorney, Agent, or Firm*—Gravely, Lieder & Woodruff

[57] ABSTRACT

A wood I-beam consists of a web and a pair of parallel flange pieces which are joined to opposite edges of the web. The web has a kerf cut into each of its opposite edges, thereby dividing each edge into a pair of legs. Each flange piece, on the other hand, has a tapered groove cut into it. After glue is applied to the tapered side walls of the grooves for the flange pieces, the opposite edges of the web are inserted into the grooves and then the two flange pieces are forced together. The taper and width of the grooves in the flange pieces is such that the side walls of the grooves bend the legs on the end edges of the web together against the natural resiliency of the wood. As a result, the web edges are urged against the side walls of the groove with sufficient force to enable the glue to set-up into an extremely strong bond.

14 Claims, 3 Drawing Figures

WOOD I-BEAM AND METHOD OF FABRICATING THE SAME

BACKGROUND OF THE INVENTION

This invention relates in general to wood beams and more particularly to wood I-beams and a method of fabricating such beams.

The typical wood I-beam of the type used in the construction of buildings consists of three all wood components—namely, a pair of flange pieces that are spaced apart and parallel and a web that extends between and along its opposite edges is joined to the flange pieces. Usually each flange piece is 2"×3" or 2"×4" nominal dimension lumber, while the web is ⅜" or ½" plywood. The resulting beam possesses substantial strength, yet is light in weight and easily handled. Moreover, flooring or other beams may be secured to it with simple nails.

Normally, the web is glued along its edges to the flange pieces, so the strength of the beam to a large measure depends on the strength of the glue joints that hold its components together. These glue joints usually lie within grooves that are cut into the flange pieces and receive the opposite edges of the web. To effect a good glue joint, pressure must be exerted between the side walls of the groove and the abutting web surfaces while the glue sets.

One procedure for developing adequate pressure at the glue joint forms the subject matter of U.S. Pat. No. 3,490,188. In this procedure the side edges of the web are passed between dies which compress the plywood at its edges and impart slight bevels to those edges. The grooves are milled into the flange with their side walls beveled at a corresponding angle. Thus, by reason of the wedge shape, a tight fit exists between the beveled edges of the webs and the tapered surfaces of the grooves in which those edges are received. This provides the force necessary to enable the glue to set up and create a strong bond.

In another procedure, which forms the subject matter of U.S. Pat. No. 4,195,462, each flange piece contains a pair of closely spaced grooves which diverge somewhat from the surface out of which they open. The web, on the other hand, has a relatively wide slot cut into its opposite edges, so that each edge possesses a pair of legs that extend the full length of the web, each rib being about as wide as a groove in the flange piece. Initially, the legs along each end edge are parallel, but when the legs are forced into the grooves in the flange pieces they flare outwardly and assume the divergence of the grooves. This distortion of the legs forces the inside faces of the legs against the inside walls of the grooves and thereby provides the pressure that is necessary to effect a strong bond at the glue joint.

SUMMARY OF THE INVENTION

One of the principal objects of the present invention is to provide an I-beam constructed entirely from wood or composite lumber that is simple and inexpensive to manufacture. Another object is to provide a wood I-beam of the type stated which naturally produces a substantial amount of pressure at the glue joint when the beam is assembled and as the glue along the glue joint sets. A further object is to provide an I-beam of the type stated that possesses substantial strength by reason of extremely strong bonds at the glue joints between its web and flange pieces. An additional object is to provide a process for easily constructing an I-beam of the type stated. These and other objects and advantages will become apparent hereinafter.

DESCRIPTION OF THE DRAWINGS

In the accompanying drawings which form part of the specification and wherein like numerals and letters refer to like parts wherever they occur

DETAILED DESCRIPTION

Figure 1:
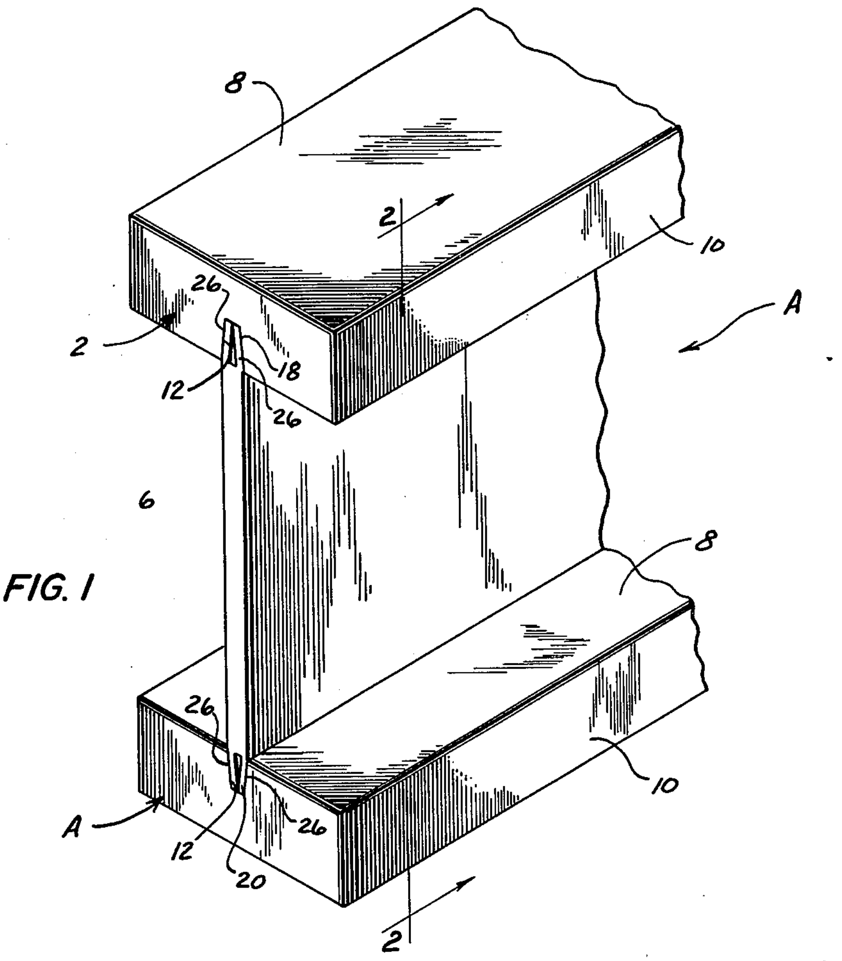
FIG. 1 is a perspective view of a wood I-beam constructed in accordance with the process of and embodying the present invention.
Figure 2:
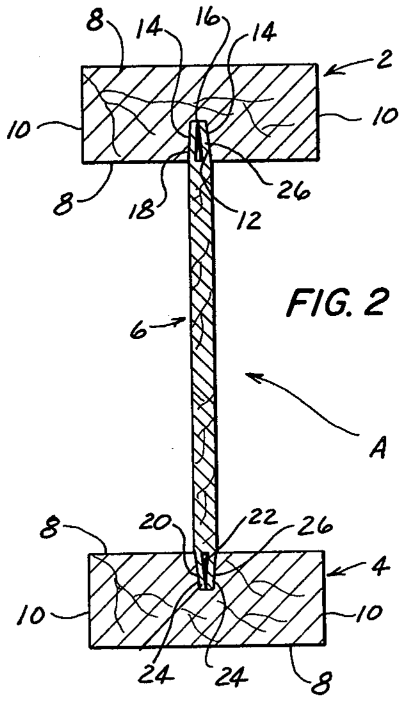
FIG. 2 is a sectional view of the I-beam taken along line 2—2 of FIG. 1.

Referring now to the drawings (FIG. 1), A designates an I-beam that is constructed entirely from wood lumber or from a composite or veneered lumber or from both and as such is ideally suited for use in the construction of buildings. The beam A comprises three major components—namely, an upper chord or flange piece 2, a lower chord or flange piece 4 that is spaced from, yet parallel to, the upper piece 2, and a web 6 that extends between the two flange pieces 2 and 4 and along its upper and lower edges is joined to those flange pieces. While the I-beam A may be used in any orientation, in most applications it will be disposed horizontally with the flange piece 2 above the flange piece 4 and the web 6 disposed in a vertical plane between the two flange pieces 2 and 4. Hence, the reference to "upper" and "lower" flange pieces 2 and 4.

Each flange piece 2 or 4 is rectangular in cross-sectional configuration and indeed may be conventional 2"×3" or 2"×4" nominal dimension lumber or composite or veneered lumber. As such it has two major surface areas 10. One of the major surface areas 8 is presented toward the opposite flange piece 2 or 4, while the other is presented away from that opposite flange piece 2 or 4. Yet both are perpendicular to the plane of the web 6. The minor surface areas 10 are parallel to the web 6 and face laterally. Moreover, corresponding minor surface areas 10 of the two flange pieces 2 and 4 on each side of the beam A lie in the same plane. The web 6 lies midway between the two parallel planes defined by the minor surface areas 10 of the flange pieces 2 and 4.

Figure 3:
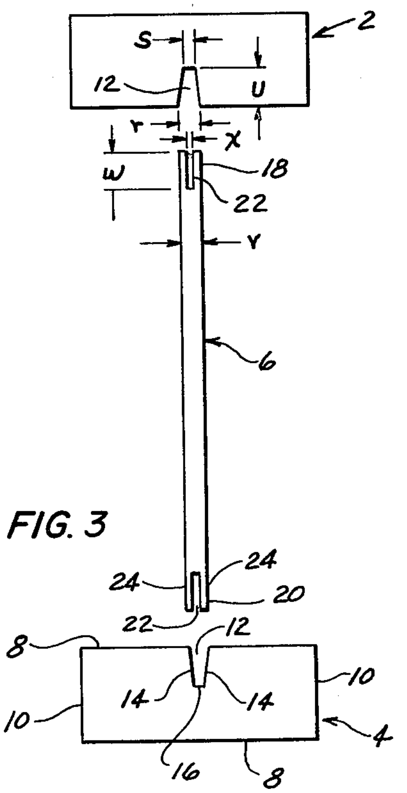
FIG. 3 is an end view showing the I-beam during assembly.

Each flange piece 2 and 4 contains a groove 12 that extends the full length of the flange piece 2 or 4 and opens out of one of its major surface areas 8. Moreover, the groove is centered midway between the two minor surface areas 10 and is symmetrical about a center plane that is parallel to the minor surface areas 10. Each groove 12 has side walls 14 and a base 16, with the side walls 14 converging toward the base 16. The spacing r (FIG. 3) between the side walls 14 at the major surface areas 8 out of which the groove 12 opens is about equal to the thickness of the web 6. The spacing s between the side walls 14 at the base 16 should be less than the thickness of the web 6—indeed less by a dimension t. In a typical flange piece 2 or 4 formed from 2"×3" nominal dimension lumber, the dimension r is ⅜", the dimension s 5/16", and the dimension u ½". The depth u of the groove 12 should range between one and two times its greatest width r.

The web 6 is preferably formed from plywood of thickness v (FIG. 3) which is equal to or slightly less than the greatest width r of the grooves 12 in the two flange pieces 2 and 4. Usually ⅜" or ½" plywood is used for the web 6, in which case the thickness v is ⅜" or ½". The web 6 has parallel upper and lower edges 18 and 20, respectively, and when it is detached from the flange pieces its thickness at the edges 18 and 20 is the thickness v. However, along each edge 18 and 20 the web 6 is provided with a slot or kerf 22 that extends the full length of the edge 18 or 20 and divides it into a pair of tines or legs 24. Being made of wood, the legs 24 will flex toward each other, and where the web 6 is plywood, the grain of the outwardly presented layers should preferably extend transversely in the web 6, that is perpendicular to the opposite edges 18 and 20. The kerfs 22 are centered midway between the sides of the web 6 and are parallel to those sides. They open out of the edges 18 and 20, and each extends into the web 6 to a depth w which is equal to the depth u of the groove 12 into which it fits. The width x of each kerf 22 is about equal to the dimension t, which is the difference between the greatest and smallest widths of the groove 12. In a typical web 6, the dimension x will be 1/16".

To assemble the I-beam A, a wood glue is applied to the side walls 14 and base 16 of the groove 12 in each flange piece 2 and 4. Then the upper edge 18 of the web 6 is aligned with and forced into the groove 12 of the upper flange piece 2, while the lower edge 20 is aligned with and forced into the groove 12 of the lower flange piece 4. As the edges 18 and 20 advance into their respective grooves 12, the legs 24 at each end edges 18 and 20 move along the side walls 14 of the grooves 12 and are forced together. In other words, the wedge-like grooves 12 bend the legs 24 along each edge 18 and 20 together against the natural resiliency of the wood. As a consequence, the legs 24, while not only lying flat against the tapered side walls 24 for the grooves 12, also bear with considerable force against those side walls, and this force enables the glue to set up under the pressure that is required to obtain a strong glue joint 26. Indeed, the two flange pieces 2 and 4 and the web 6 are all held together within a jig as the glue sets. The glue not only joins the side faces of legs 24 to the side walls 14 of the grooves 12, but further joins the end of the legs 24 to the base 16 of the grooves 12 and the force necessary to acquire a good glue joint at the latter location derives from the force imparted by the jig itself. However, the glue joints 26 along the side walls 14 of the grooves 12 are of considerably greater significance and would impart substantial strength to the beam A even in the absence of a glue joint at the base 16 of each groove 12. In short, practically all of the loading is taken through the glue joints 26 between the side faces of the legs 24 and the side walls 14 of the grooves 12, and it is these glue joints that set up under the forces derived from the natural resiliency of the wood in the web 6.

In lieu of applying the glue to the side walls 14 and bases 16 of the grooves 12, the glue may be applied to the side and end faces of the legs 24 along the end edges 18 and 20 of the web 6, or it may be applied to both the web legs 24 and groove surfaces 14 and 16.

In the completed I-beam A, the edges 18 and 20 of the web 6 conform to the taper of the grooves 12 in the flange pieces 2 and 4, this being by reason of the kerfs 22 in the edges 18 and 20. The kerfs 22, of course, permit the legs 24 along each edge 18 and 20 to bend toward each other and impart a tapered configuration to the edges 18 and 20, with the taper conforming precisely to that of the grooves 12 into which the edges 18 and 20 fit.

This invention is intended to cover all changes and modifications of the example of the invention herein chosen for purposes of the disclosure which do not constitute departures from the spirit and scope of the invention.

What is claimed is:

1. An I-beam comprising: a pair of flange pieces made from a lumber material such as wood, each flange piece having a groove that opens out of one of its surfaces, the flange pieces being arranged such that they are spaced apart and such that the groove on the one flange piece is presented opposite to and opens toward the groove on the other flange piece, each groove being tapered such that it is widest in the region of the surface out of which it opens and has side walls which converge generally from that surface to a base; a web interposed between the two flange pieces and being made from lumber such as wood, the web having generally parallel side faces and opposite edges, with the side faces extending all the way to the opposite edges, one of the opposite edges of the web being in the groove of the one flange piece and the other opposite edge being in the groove of the other flange piece, the web at each of its opposite edges having kerfs which divide the web along each of its edges into a pair of legs, the legs having outside faces which in the region of the bases for the kerfs are spaced apart a distance generally equal to the thickness of the web so that the outside faces of the legs are part of the side faces of the web, the pair of legs along each edge further having their outside faces in face-to-face contact with the side walls of the groove in which that edge is located, whereby the legs within each groove converge toward each other; and glue between the side walls of each groove and the outside faces of the legs that are within the groove so as to secure the flange pieces to the web.

2. An I-beam according to claim 1 wherein the web is formed from plywood and the grain of the plys at the side faces of the web extends generally perpendicular to the flange pieces.

3. An I-beam according to claim 1 wherein the depth of each kerf is substantially equal to the depth of the groove in which the edge out of which the kerf opens is located.

4. An I-beam according to claim 3 wherein the edges of the web are generally against the bases of the grooves.

5. An I-beam according to claim 1 wherein each kerf extends the full length of the edge in which it is located.

6. An I-beam according to claim 5 wherein the side walls of each groove urge the legs for the edge that is within that groove together such that the natural resilience of the wood urges the outside faces of the legs against the side walls of the groove.

7. An I-beam according to claim 6 wherein each groove is widest at the flange piece surface out of which it opens, and the width of the groove at that location is about equal to the thickness of the web.

8. An I-beam according to claim 6 wherein the flange pieces are rectangular in cross-section and have major and minor surface areas, and the groove for each flange piece opens out of one of its major surface areas.

9. A process for fabricating an I-beam, said process comprising cutting kerfs into opposite edges of a web that is formed from lumber such that each edge is divided into a pair of legs having outside faces that are generally flush with the outside faces of the web; cutting a groove into each of two flange pieces that are to be joined to the web at the edges of the web, the flange pieces also being formed from a lumber, each groove having side walls tapered such that where the groove opens out of its flange piece it is wide enough to accept an edge of the web, but inwardly therefrom is narrower than the web; applying glue to the outside faces of the legs on the web and to the side walls of the groove; and forcing the edges of the webs into the grooves of the flange pieces with sufficient force to bend the two legs along each edge toward each other, whereby the legs bear against the tapered side walls of the groove with sufficient force to enable the glue upon setting to form a strong glue joint.

10. A process according to claim 9 wherein each edge is forced into its groove for the full depth of the groove.

11. A process according to claim 9 wherein the kerf along each edge of the web is as deep as the groove into which that edge fits.

12. The process according to claim 9 wherein the web is formed from plywood, and the grain in the plys along the outside faces of the web extends generally perpendicular to the flange pieces.

13. A structural member for a building or the like, said member comprising: a pair of chords made from lumber such as wood, each chord having a groove that opens out of one of its surfaces, the chords being arranged such that they are spaced apart and such that the groove on the one chord is presented opposite to and opens toward the groove on the other chord, each groove being tapered such that it is widest in the region of the surface out of which it opens and has side walls which converge generally from that surface to a base; a web interposed between the two chords and being made from lumber such as wood, the web having generally parallel side faces and opposite edges, with the side faces extending all the way to the opposite edges, one of the opposite edges of the web being in the groove of the one chord and the other opposite edge being in the groove of the other chord, the web at its opposite edges having kerfs which extend out to those edges and divide the web along each of its edges into a pair of legs, the legs having outside faces which at the regions of the bottoms of the kerfs are spaced apart a distance generally equal to the thickness of the web so that the outside faces of the legs form part of the side faces of the web, the pair of legs in each groove further having their outside faces against the side walls of the groove in which that edge is located such that face-to-face contact exists between outside faces of the legs and the side walls of the groove, whereby the legs within each groove converge toward each other; and glue between the side walls of the grooves and the outside faces of the legs so as to secure the chords to the web.

14. A structural member according to claim 13 wherein the web is formed from plywood and the grain of the plys at the side faces of the web extends generally perpendicular to the chords.

* * * * *